April 14, 1936.  W. E. KLAUBERG  2,037,580
TRIANGLE METER
Filed Jan. 27, 1934  2 Sheets-Sheet 1

INVENTOR.
Walter E. Klauberg.

April 14, 1936.  W. E. KLAUBERG  2,037,580
TRIANGLE METER
Filed Jan. 27, 1934  2 Sheets-Sheet 2

INVENTOR.
Walter E. Klauberg.

UNITED STATES PATENT OFFICE 2,037,580

TRIANGLE METER

Walter E. Klauberg, Houston, Tex.

Application January 27, 1934, Serial No. 708,625

2 Claims. (Cl. 33—98)

This invention relates to a novel form of instrument for solving any triangle and consists principally of three protractor plates with index devices for reading the angles, and three graduated arms with vernier attachments for reading the length of sides of the triangles.

The invention also consists in certain other features of construction and in the combination and arrangement of the several parts, to be hereinafter fully described, illustrated in the accompanying drawings, and specifically pointed out in the appended claims.

In describing my invention in detail, reference will be had to the accompanying drawings wherein like characters denote like or corresponding parts throughout the several views, and in which:—

Figure 10:
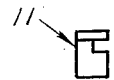

Fig. 10 is a right-end view of vertex pin 11. Vertex pin 12 is an exact duplicate of vertex pin 11.

Figure 11:
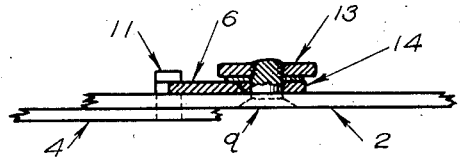

Fig. 11 is a sectional view of arm clamp 13.

As shown in these views the instrument consists of a combination of three angle protractors 1, 2 and 3, with index devices 7, 8 and 9; and three graduated arms or scales 4, 5 and 6, each having a clamp 13 for locking at any desired length, and vernier scales on vertex pins 11, 12 and 21 for close reading of side lengths.

Arm 4 is pivoted at the center of protractor plate 2 by vertex pin 11. Arm 5 is pivoted at the center of protractor plate 3 by vertex pin 12. Arm 6 is pivoted at the center of protractor plate 1 by vertex pin 10. The outside edges of arms 4, 5 and 6 are beveled to fit the beveled edges of arm guides 14. When not clamped, arm 4 is free to slide along the straight edge of protractor plate 3 between vertex pin 12 and arm guide 14, arm 5 slides along the straight edge of protractor plate 1, and arm 6 slides along the straight edge of protractor plate 2.

Protractor plate 1 is counter-sunk in the base of case 17 and fastened with machine screws 20. Protractor plate 3 slides on the surface of the base of case 17 and protractor plate 2 is supported in a plane parallel with plates 1 and 3 by the projecting lower edge of index 8 and is free to slide in any direction. Channel 22 makes room for index 9 as it slides lengthwise of case 17.

Figure 1:
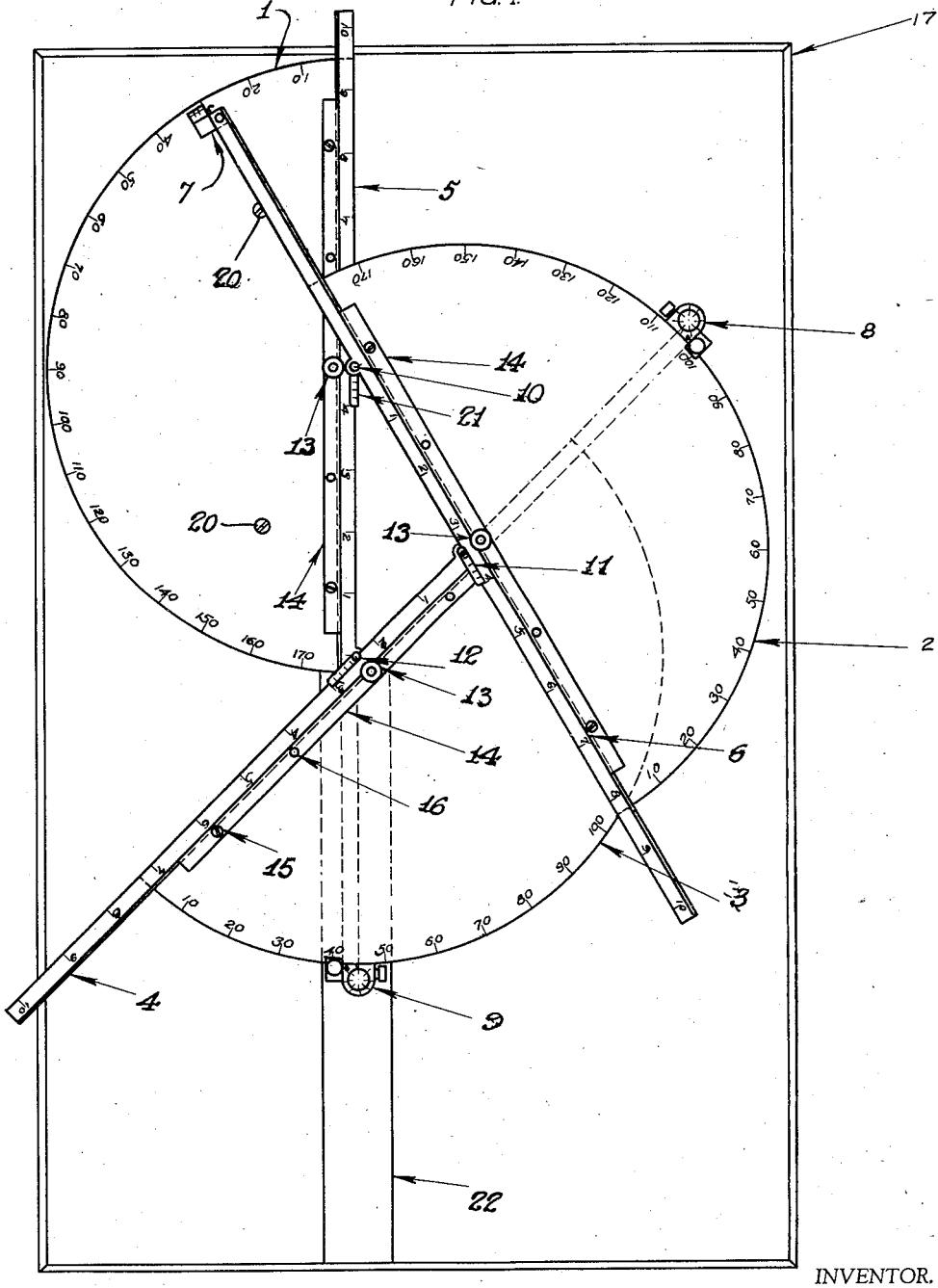
Fig. 1 is a diagrammatic plan view of the invention and showing the same set at angle A=30°, angle B=105°, and angle C=45°.
Figure 2:
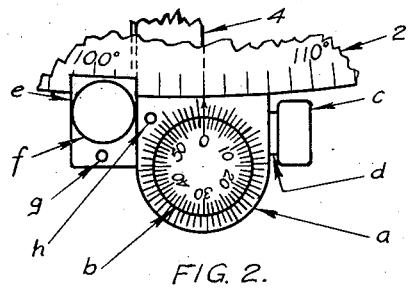
Fig. 2 is an enlarged plan view of index 8, showing the vernier arrangement which reads to one second. Index 9 is an exact duplicate of index 8.
Figure 3:
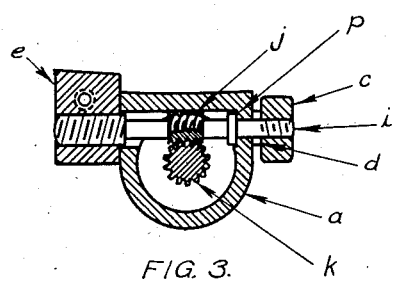
Fig. 3 is a sectional plan view of index 8 showing the gear arrangement.
Figures 5, 6:
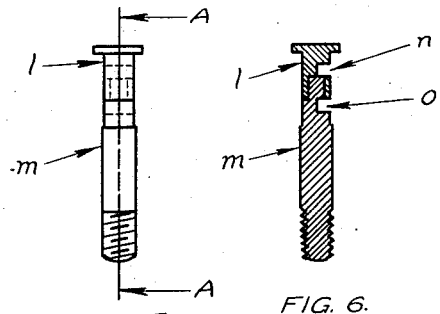
Fig. 5 is a view of vertex pin 10.
Fig. 6 is a section on line A—A of Figure 5 showing the swivel joint of vertex pin 10.
Figure 8:
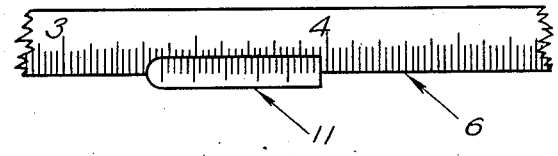
Fig. 8 is an enlarged view of vertex pin 11 and part of arm 6 showing the vernier arrangement.
Figure 7:
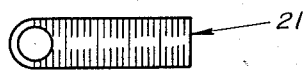
Fig. 7 is a view of vernier clip 21.
Figure 9:
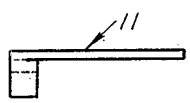
Fig. 9 is a front view of vertex pin 11.

The operation of index 8 may be understood by referring to Figures 2 and 3. When thumb screw f is tightened the jaws of clamp e are drawn together to grip the edge of protractor plate 2. The clamp may be set with its edge that is next to the index body a, exactly on a degree line of protractor plate 2. As thumb screw c is turned to the right the worm shaft i turns with it, causing the index body to move away from the clamp e and carrying arm 4 with it. Worm shaft i screws into clamp e with a left-hand thread and shoulder p works against index body a.

Worm gear j has a quadruple, left-hand worm which meshes with the fourteen-tooth wormwheel k, which is connected by a vertical shaft with dial b. When thumb screw c is turned to the right (clock-wise) and the index moves away from the clamp the dial b is caused to rotate or revolve anti-clockwise and makes one complete revolution as the index body moves across one degree space on the protractor plate 2. To obtain this result the thread chosen for the end of wormshaft i that screws into clamp e has a lead of .025 inch per revolution and is geared to make 3½ revolutions per one revolution of the dial b, or an advance of .0875 inch. The radius from the center of protractor plate 2 to the center line of worm-shaft i is 5.015 inches. Sine of 1° angle=.01745. 5.015″×.01745=.0875″.

The dial b is divided into 60 equal graduations. The vernier scale surrounding dial b has a part of its arc (equal to 59 dial b graduations) divided into 60 equal spaces. As dial b revolves the space of one second the first vernier line to the right of index arrow is even with a dial b line, as dial b revolves the space of two seconds the second line on the vernier comes even with a line on dial b, and so on up to sixty, when the next minute line will be even with the index arrow at top of body a. The dowel pin h connects index body a in place on arm 4.

Figure 4:
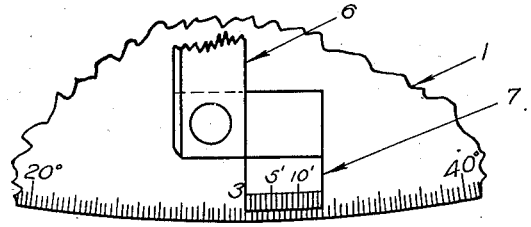
Fig. 4 is an enlarged view of index 7 showing the vernier arrangement which reads to one minute.

By referring to Figure 4 it will be seen that index 7 reads the angle to one minute, the protractor plate 1 being graduated to quarter-degree spaces, and the vernier scale of index 7 being a space equal to fourteen of the quarter-degree spaces and being divided into fifteen equal divisions.

Arms 4, 5, and 6 each have ten inches graduated from the center of the vertex pin. The inches are divided into tenths and fortieths and the vernier scale for each arm divides a space equal to twenty-four of the fortieths into twenty-five squal spaces, thereby reading in thousandths of an inch. The sides of any triangle may be brought within range of the instrument by moving the decimal points when given in decimals or by multiplying or dividing each side by 10.

Vernier clip 21 is shaped so that it may be swung around on vertex pin 10 and read from either side, thereby allowing the triangle to be closed upon arm 5 as well as on arms 4 and 6. The arms are clamped at any desired length simply by tightening clamp nuts 13. See Fig. 11. Arm guide 14 is about .005 inch thinner than arm 6 and the head of machine screw $q$ is countersung in protractor plate 2.

Vertex pin 10 has a swivel joint so that slot $o$ may remain in a fixed position for arm 5 and slot $n$ is free to revolve about the vertical axis with protractor plate 2.

The arms 4, 5, and 6 may be made ten inches long or any desired length or they may be provided with extensions with flush joints.

Having thus described my invention, what I claim as new is:—

1. An instrument of the class described comprising, three superposed protractors and three graduated arms associated therewith arranged to simulate a triangle, each arm being provided at an end thereof with an index device, a base having a recess therein for receiving the bottom one of said protractors, the middle protractor resting on the surface of the base, a groove in said base for accommodating the index device associated with said middle protractor, and the upper protractor being supported in spaced relation to the base by means of its associated index device.

2. An instrument of the class described comprising, three superposed semi-circular protractors, three graduated arms associated therewith and arranged to simulate a triangle, said arms each being provided with an index device which comprises: a body recessed to fit the semi-circular edge of its associated protractor, a revoluble dial graduated in minutes and surrounded by a vernier second scale on said body, a vertical shaft and pinion fixed to said dial, a horizontal shaft with a threaded end portion journaled in the body and having intermediate the ends thereof a worm gear meshing with said pinion, a clamp for gripping the protractor and operably engaging the said threaded end portion of the horizontal shaft.

WALTER E. KLAUBERG.